(12) United States Patent
Handschke et al.

(10) Patent No.: US 10,434,949 B2
(45) Date of Patent: Oct. 8, 2019

(54) STEP ASSEMBLY FOR A FIRE TRUCK (71) Applicant: Oshkosh Corporation, Oshkosh, WI (US)

(72) Inventors: Scott M. Handschke, Appleton, WI (US); Michael S. Knudson, Appleton, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 16/350,224

(22) Filed: Oct. 15, 2018

(65) Prior Publication Data
US 2019/0118721 A1    Apr. 25, 2019

Related U.S. Application Data (63) Continuation of application No. 14/904,663, filed as application No. PCT/US2014/048792 on Jul. 30, 2014, now Pat. No. 10,099,622.

(60) Provisional application No. 61/860,754, filed on Jul. 31, 2013.

(51) Int. Cl.
*B60R 3/02* (2006.01)
*B62D 39/00* (2006.01)

(52) U.S. Cl.
CPC ............... *B60R 3/02* (2013.01); *B62D 39/00* (2013.01)

(58) Field of Classification Search
CPC .......... B60R 3/00; B60R 3/02; B60H 1/00278
USPC ................................................. 280/163, 166
See application file for complete search history.

(56) References Cited

U.S. PATENT DOCUMENTS

| | | | | |
|---|---|---|---|---|
| 3,067,835 A * | 12/1962 | Valley | .............. | B60R 3/02 182/95 |
| 3,330,577 A * | 7/1967 | Mills | .............. | B60R 3/007 182/88 |
| 3,606,382 A * | 9/1971 | Pollock | .............. | B60R 3/02 280/166 |
| 3,807,757 A * | 4/1974 | Carpenter | .............. | B60R 3/02 182/95 |
| 3,876,230 A * | 4/1975 | Phillips | .............. | B60R 3/02 280/166 |

(Continued)

FOREIGN PATENT DOCUMENTS

| | | |
|---|---|---|
| JP | 08-011633 | 1/1996 |
| JP | 08-156690 | 6/1996 |

(Continued)

OTHER PUBLICATIONS

International Search Report and Written Opinion for International Application No. PCT/US2014/048792, dated Nov. 5, 2014, 12 pages.

*Primary Examiner* — Jeffrey J Restifo
(74) *Attorney, Agent, or Firm* — Foley & Lardner LLP

(57) ABSTRACT

A stair assembly for a vehicle includes a frame, a first stair, a second stair, and an actuator. The frame includes a plate extending between a first side member and a second side member. The first stair is rotatably coupled to the frame and includes a first step body positioned on a first side of the plate. The second stair is rotatably coupled to the frame and includes a second step body positioned on the first side of the plate. The actuator is configured to move the first stair and the second stair between a deployed position and a storage position, and the actuator is separated from the first step body and the second step body by the plate.

16 Claims, 12 Drawing Sheets

(56) References Cited

U.S. PATENT DOCUMENTS

| | | | | |
|---|---|---|---|---|
| 4,108,457 A * | 8/1978 | Garrett | | B60R 3/02 105/447 |
| 5,505,476 A * | 4/1996 | Maccabee | | B60R 3/02 280/163 |
| 5,547,040 A * | 8/1996 | Hansen | | B60R 3/02 182/127 |
| 5,803,475 A * | 9/1998 | Dick | | B60R 3/007 280/163 |
| 5,819,670 A * | 10/1998 | O'Connor | | A47B 5/06 108/48 |
| 5,941,342 A * | 8/1999 | Lee | | B60R 3/02 182/127 |
| 5,957,237 A * | 9/1999 | Tigner | | B60R 3/02 182/127 |
| 6,213,486 B1 * | 4/2001 | Kunz | | B60R 3/02 280/163 |
| 6,659,224 B2 * | 12/2003 | Medsker | | B60R 3/02 182/127 |
| 7,677,584 B2 * | 3/2010 | Raley | | B60R 3/02 182/127 |
| 7,857,337 B2 * | 12/2010 | Ferguson | | B60R 3/02 182/127 |
| 8,075,008 B1 * | 12/2011 | Hanser | | B60R 3/02 182/88 |
| 8,246,063 B1 * | 8/2012 | Rowland | | B60R 3/02 280/163 |
| 8,251,178 B2 * | 8/2012 | Krobot | | B60R 3/02 182/127 |
| 8,602,431 B1 * | 12/2013 | May | | B60R 3/02 280/163 |
| 8,662,512 B2 * | 3/2014 | May | | B60R 3/02 280/163 |
| 8,668,217 B2 * | 3/2014 | Ziaylek | | B60R 3/02 280/163 |
| 8,678,411 B2 * | 3/2014 | Kibler | | E06C 5/06 182/127 |
| D717,713 S * | 11/2014 | Whalen | | D12/317 |
| 9,010,473 B1 * | 4/2015 | Rasmussen | | B60R 3/02 180/166 |
| 9,022,405 B2 * | 5/2015 | Kibler | | B60R 3/02 182/127 |
| 9,487,148 B2 * | 11/2016 | Kichline, Jr. | | B60R 3/02 |
| 9,527,448 B1 * | 12/2016 | Kay | | B60R 3/02 |
| 9,617,788 B2 * | 4/2017 | Goodson | | E06C 1/005 |
| 9,725,042 B1 * | 8/2017 | Hanser | | B60R 3/02 |
| 10,099,622 B2 * | 10/2018 | Handschke | | B60R 3/02 |
| 10,137,838 B2 * | 11/2018 | Finstad | | B60R 3/02 |
| 2008/0157500 A1 * | 7/2008 | Raley | | B60R 3/02 280/166 |

FOREIGN PATENT DOCUMENTS

| | | |
|---|---|---|
| JP | 2001-071815 | 3/2001 |
| JP | 2002-166780 | 6/2002 |
| JP | 2002-242121 | 8/2002 |

* cited by examiner

STEP ASSEMBLY FOR A FIRE TRUCK

CROSS-REFERENCE TO RELATED APPLICATIONS

This application is a continuation of U.S. patent application Ser. No. 14/904,663, filed Jan. 12, 2016, which was the National Stage of International Application No. PCT/US2014/048792, filed Jul. 30, 2014, which claims the benefit of and priority to U.S. Provisional Patent Application No. 61/860,754, filed Jul. 31, 2013, all of which are incorporated herein by reference in their entireties.

BACKGROUND

The present application relates to a fire apparatus. Specifically, the present application relates to a step assembly for a fire truck. Fire trucks include a cab assembly having seats or equipment therein for use by operators (e.g., firefighters, emergency personnel, etc.). Operators enter and exit the cab of the fire truck through various doors. Doors at the front of a cab assembly may be provided for use by a driver or a captain of the fire truck, and doors at the rear of the cab assembly may be provided for use by other operators (e.g., the other firefighters in the company). The cab assembly may include a stair assembly to facilitate ingress and egress by the operators.

Traditional stair assemblies are fixed to the cab assembly. By way of example, the stair assembly may include a plurality of flat plates welded to a frame of the cab assembly. Other traditional stair assemblies include a step structure that is rotatably coupled to the frame of the cab assembly. An actuator may be used to rotate the step structure outward for use or inward for storage. However, traditional fixed stair assemblies and moveable step structures protrude into the cab assembly and reduce the area of the cab that may be utilized by operators. Despite this deficiency, traditional fixed stair assemblies and moveable step structures remain the primary devices utilized on fire trucks to facilitate operators' ingress and egress.

SUMMARY

One exemplary embodiment of the present application relates to a stair assembly for a vehicle including a frame, a first stair, a second stair, and an actuator. The frame includes a plate extending between a first side member and a second side member. The first stair is rotatably coupled to the frame and includes a first step body positioned on a first side of the plate. The second stair is rotatably coupled to the frame and includes a second step body positioned on the first side of the plate. The actuator is configured to move the first stair and the second stair between a deployed position and a storage position, and the actuator is separated from the first step body and the second step body by the plate.

Another exemplary embodiment of the present application relates to a vehicle including a cab assembly and a stair assembly. The cab assembly includes a body panel coupled to a support. The body panel defines an opening through which an operator accesses an interior of the cab assembly. The stair assembly is positioned at a lower portion of the opening and is moveable between a deployed position and a storage position. The stair assembly includes a frame that is coupled to the support of the cab assembly, a first stair, a second stair, and an actuator. The frame includes a plate extending between a first side member and a second side member, the first stair is rotatably coupled to the frame and includes a first step body positioned laterally outward of the plate, and the second stair is rotatably coupled to the frame and includes a second step body positioned laterally outward of the plate. The actuator is configured to move the stair assembly between the deployed position and the storage position and is positioned laterally inward of the plate.

Still another exemplary embodiment of the present application relates to a method of providing ingress and egress for a vehicle. The method includes providing a stair assembly including: a frame including a plate extending between a first side member and a second side member; a first stair rotatably coupled to the frame and including a first step body positioned laterally outward of the plate; and a second stair rotatably coupled to the frame and including a second step body positioned laterally outward of the plate. The method further includes positioning an actuator laterally inward of the plate. The actuator is configured to move the first stair and the second stair between a deployed position and a storage position.

The invention is capable of other embodiments and of being carried out in various ways. Alternative exemplary embodiments relate to other features and combinations of features as may be recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
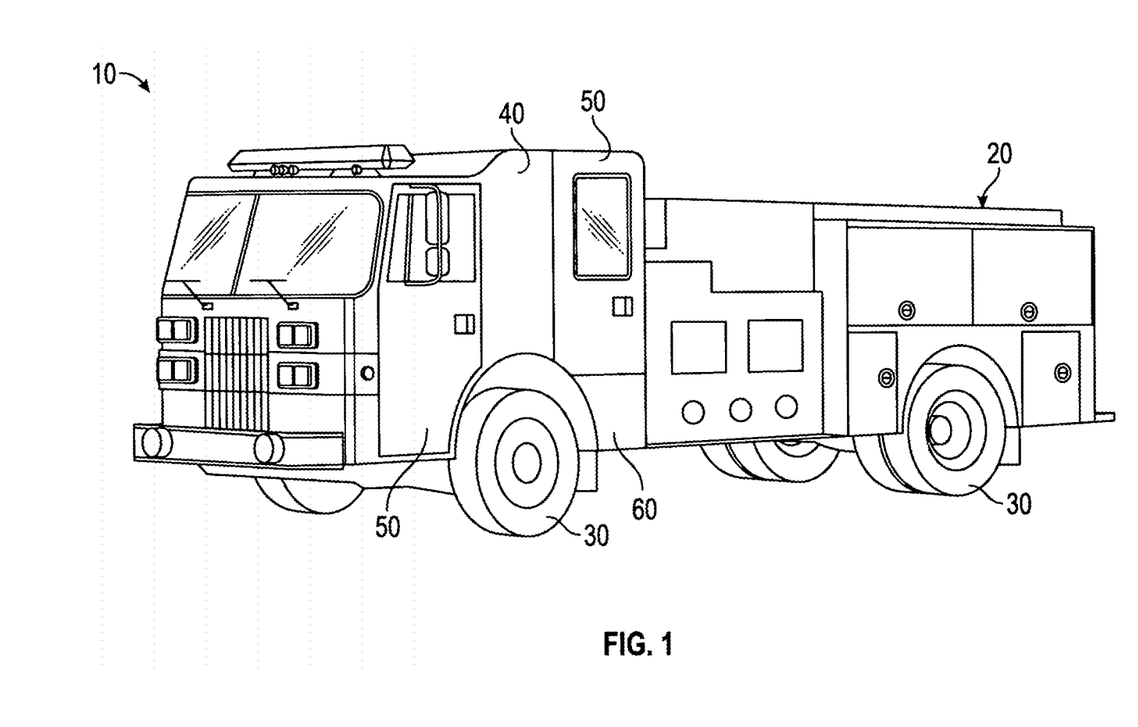
FIG. 1 is an elevation view of a fire truck, according to an exemplary embodiment.

According to the exemplary embodiment shown in FIG. 1, a vehicle, shown as fire truck 10, includes a body assembly, shown as rear section 20, and a number of wheels with tires 30. As shown in FIG. 1, fire truck 10 is a pumper truck. According to alternative embodiments, fire truck 10 may be an aerial truck, a rescue truck, a commercial truck, a tanker, or still another fire apparatus. According to the exemplary embodiment shown in FIG. 1, fire truck 10 is a municipal fire truck. According to alternative embodiments, fire truck 10 may be an airport firefighting and rescue (ARFF) vehicle, a forest fire apparatus, or still another type of firefighting vehicle. According to still other embodiments, the vehicle may be another type of vehicle (e.g., a military vehicle, a concrete mixing vehicle, an access vehicle, a commercial vehicle, etc.).

Referring still to the exemplary embodiment shown in FIG. 1, fire truck 10 includes a cab assembly, shown as front cabin 40. As shown in FIG. 1, front cabin 40 is positioned forward of rear section 20 (e.g., with respect to a forward direction of travel for the vehicle). According to an alternative embodiment, the cab assembly may be positioned behind rear section 20 (e.g., with respect to a forward direction of travel for the vehicle). The cab assembly may be positioned behind rear section 20 on, by way of example, a rear tiller fire truck.

According to an exemplary embodiment, front cabin 40 includes a plurality of body panels coupled to a support (e.g., a structural frame assembly). The plurality of body panels may define a plurality of openings through which an operator accesses (e.g., for ingress, for egress, to retrieve components from within, etc.) an interior of front cabin 40. As shown in FIG. 1, front cabin 40 includes a pair of doors 50 positioned over the plurality of openings defined by the plurality of body panels. A first door 50 may be coupled to front cabin 40 forward of wheel and tire 30. The first door 50 may provide access to the interior of front cabin 40 for a driver of fire truck 10 or a captain of the firefighting company. A second door 50 may be coupled to front cabin 40 behind wheel and tire 30. The second door 50 may provide access to the interior of front cabin 40 for other firefighters.

Referring still to the exemplary embodiment shown in FIG. 1, operators may access the interior of front cabin 40 with the assistance of a stair assembly, shown as stair assembly 60. According to an exemplary embodiment, stair assembly 60 includes steps that are positioned lower than stairs of traditional stair assemblies, thereby improving the comfort for operators accessing front cabin 40. In some embodiments, door 50 includes a handrail to further assist the operator when accessing the interior of front cabin 40. As shown in FIG. 1, stair assembly 60 is coupled to front cabin 40 and positioned below the second door 50. In other embodiments, stair assembly 60 may be positioned at another door 50 (e.g., the first door 50, etc.) or in still another position on fire truck 10. By way of example, stair assembly 60 may be positioned at a rear portion of fire truck 10 to facilitate access by operators to hoses or other equipment stored onboard, may be positioned along a side of fire truck 10 to facilitate access to compartments of rear section 20, or may be otherwise positioned.

According to an exemplary embodiment, stair assembly 60 is moveable between a deployed position and a storage position. In some embodiments, stair assembly 60 is manually actuable between the deployed position and the storage position (i.e. a user interaction or a user-triggered indication may motivate the actuation of stair assembly 60). In other embodiments, stair assembly 60 may be automatically actuated between the deployed position and the storage position. By way of example, stair assembly 60 may be automatically actuated into the storage position when fire truck 10 begins to move, moves above threshold speed, when the transmission is placed in a drive gear, when door 50 is closed, or when still other conditions are satisfied. By way of further example, stair assembly 60 may be automatically actuated into the deployed position when fire truck 10 stops moving, moves slower than a threshold speed, when the transmission is placed in a parking gear, when door 50 is opened, or when still other conditions are satisfied. Various sensors and control modules may facilitate such automatic actuation.

Figure 2:
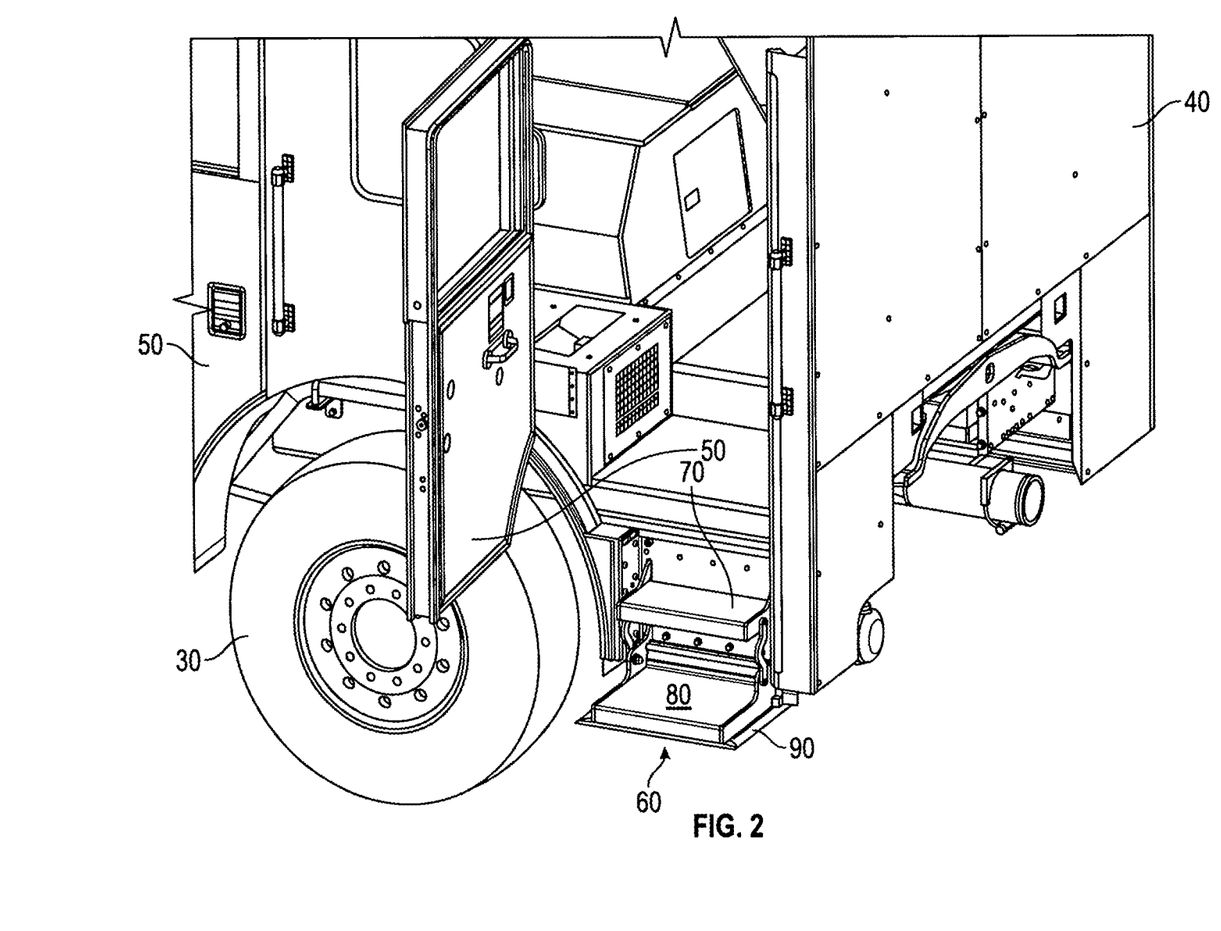
FIG. 2 is a side elevation view of a fire truck having a stair assembly configured in a deployed position, according to an exemplary embodiment.
Figure 3:
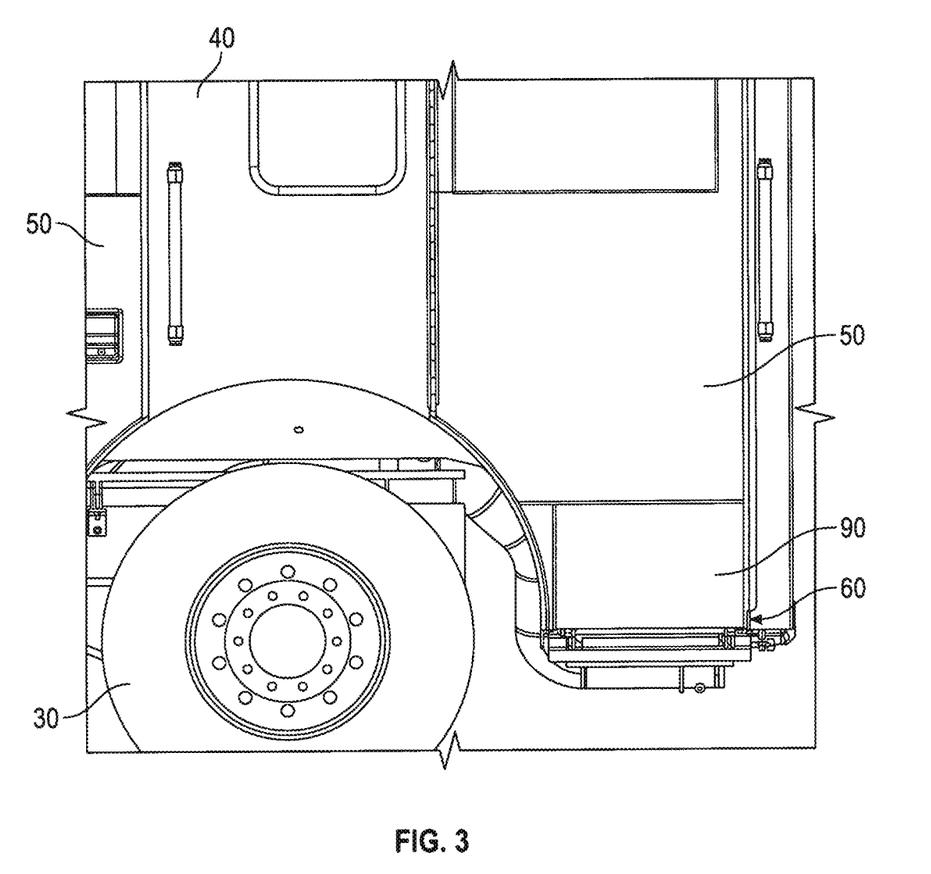
FIG. 3 is a side elevation view of a fire truck having a stair assembly configured in a storage position, according to an exemplary embodiment.
Figure 4:
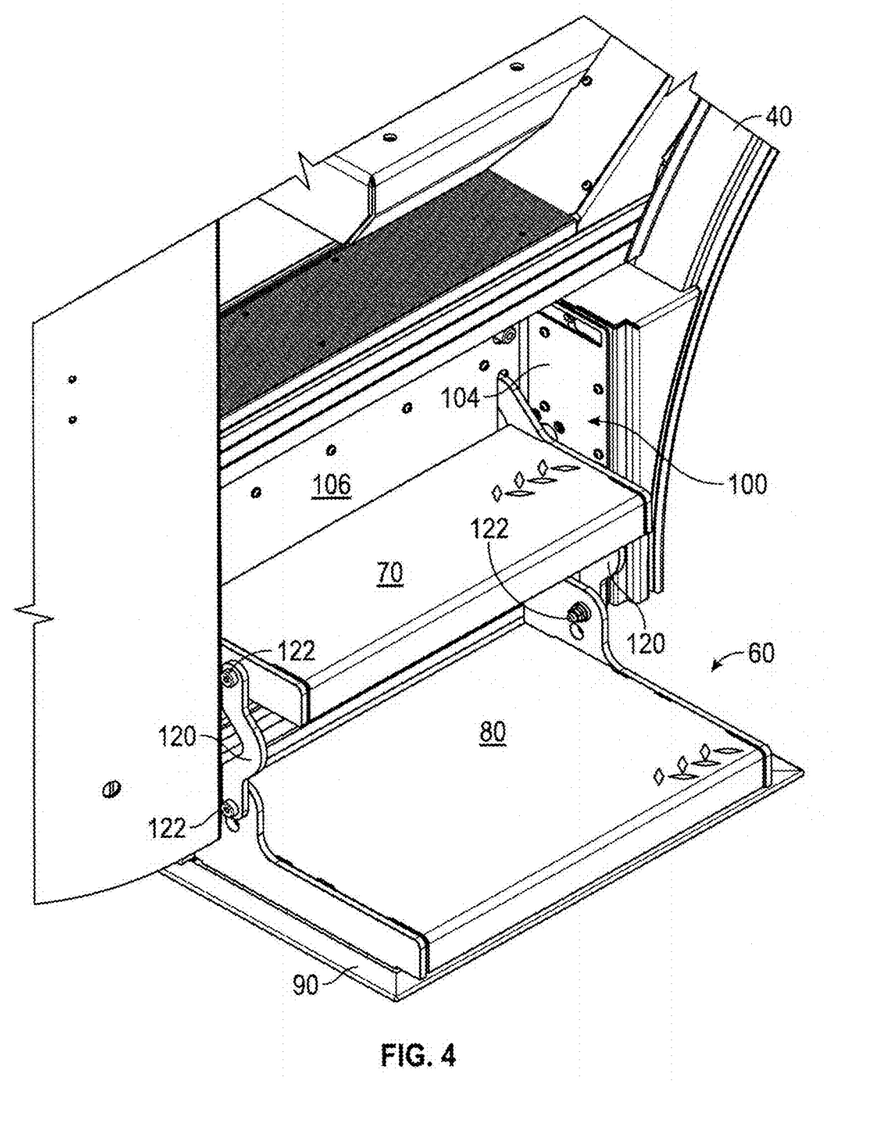
FIG. 4 is a front elevation view of a stair assembly coupled to a vehicle body and configured in a deployed position, according to an exemplary embodiment.
Figure 5:
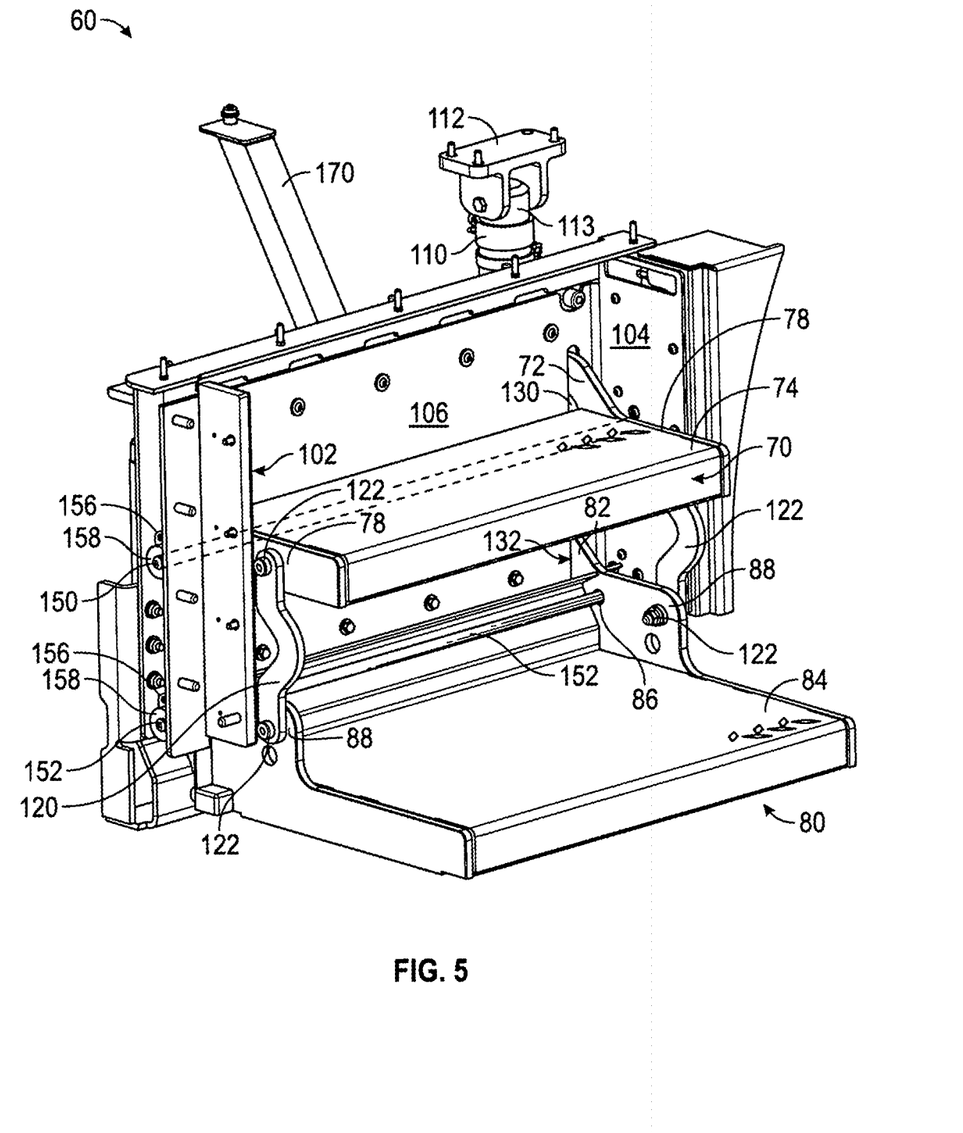
FIG. 5 is a top front elevation view of a stair assembly configured in a deployed position, according to another exemplary embodiment.

Referring next to FIGS. 2-3, front cabin 40 is shown having stair assembly 60 configured in various positions. As shown in FIG. 2, door 50 is open, and stair assembly 60 is configured in the deployed position. In the deployed position, an operator may utilize stair assembly 60 to access an interior of front cabin 40. According to the exemplary embodiment shown in FIG. 2, stair assembly 60 includes a first stair, shown as upper stair 70, and a second stair, shown as lower stair 80. As shown in FIGS. 2-3, lower stair 80 is larger (e.g., has a larger surface area to step upon) than upper stair 70. According to an alternative embodiment, stair assembly 60 includes more or fewer stairs (e.g., a single stair, three stairs, etc.). As shown in FIG. 3, door 50 is closed, and stair assembly 60 is configured in the storage position. In the storage position, stair assembly 60 does not protrude laterally outward of front cabin 40. The stairs of stair assembly 60 are stowed away within front cabin 40 when stair assembly 60 is configured in the storage position. According to an exemplary embodiment, stair assembly 60 is flush with door 50 when configured in the storage position (i.e. no part of stair assembly 60 protrudes laterally outward past an outer lateral side of front cabin 40).

As shown in FIG. 2, lower stair 80 is coupled to a plate, shown as cover plate 90. Cover plate 90 moves with lower stair 80 as stair assembly 60 moves between the deployed position and the storage position. According to an exemplary embodiment, cover plate 90 is positioned along a lower surface of lower stair 80 when stair assembly 60 is configured in the storage position. As shown in FIG. 3, cover plate 90 has a larger surface area than lower stair 80 such that, when stair assembly 60 is in the storage position, cover plate 90 completely covers lower stair 80 and the other parts of stair assembly 60. According to an exemplary embodiment, cover plate 90 encloses stair assembly 60 to protect various components from damage due to debris, moisture, or still other hazards (e.g., impact, etc.).

Referring next to the exemplary embodiment shown in FIGS. 4-10, various components operate to configure stair assembly 60 between the deployed position and the storage position. Upper stair 70, lower stair 80, and cover plate 90 are rotatably coupled to a frame, shown as step box 100. According to an exemplary embodiment, step box 100 houses (i.e. stores, contains, receives, etc.) the entirety of upper stair 70 and lower stair 80 when stair assembly 60 is configured in the storage position. According to an exemplary embodiment, upper stair 70 and lower stair 80 protrude from step box 100 when stair assembly 60 is configured in the storage position.

As shown in FIGS. 4-10, step box 100 includes a first side member, shown as side plate 102, and a second side member, shown as side plate 104. Side plate 102 and side plate 104 are coupled to a plate, shown as kick plate 106. Kick plate 106 is a flat member having a first side (e.g., a first side surface) separated from a second side (e.g., a second side surface) by a thickness of material, according to an exemplary embodiment. In other embodiments, kick plate 106 is otherwise shaped and has a first side and a second side. According to the exemplary embodiment shown in FIGS. 5-10, step box 100 includes a support, shown as beam 170, that is positioned to transfer loading applied to stair assembly 60 into the vehicle (e.g., a cab assembly, etc.).

According to an exemplary embodiment, step box 100 is coupled to a portion of fire truck 10. By way of example, at least one of side plate 102, side plate 104, and kick plate 106 may be coupled to a support of front cabin 40. In some embodiments, step box 100 is removably coupled to fire truck 10 (e.g., with a plurality of bolted connections, etc.). In other embodiments, step box 100 is fixed to fire truck 10 (e.g., with a welded connection, adhesively secured, etc.). In either embodiment, step box 100 may be retrofitted to a fire truck 10 or may be installed during the initial manufacture of fire truck 10.

Figure 11:
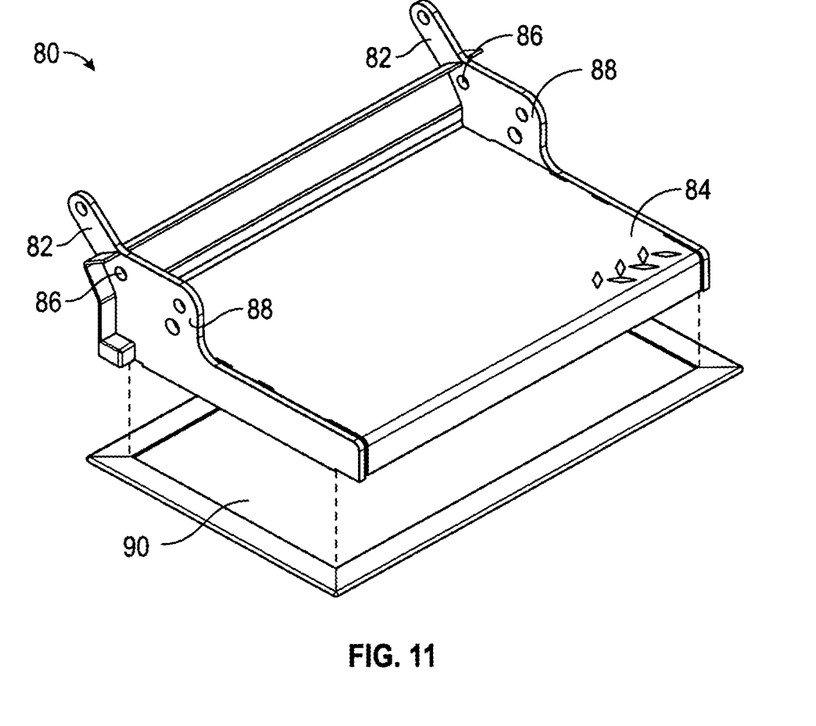
FIGS. 11-13 are a front elevation views of stairs for a stair assembly, according to an exemplary embodiment.
Figure 12:
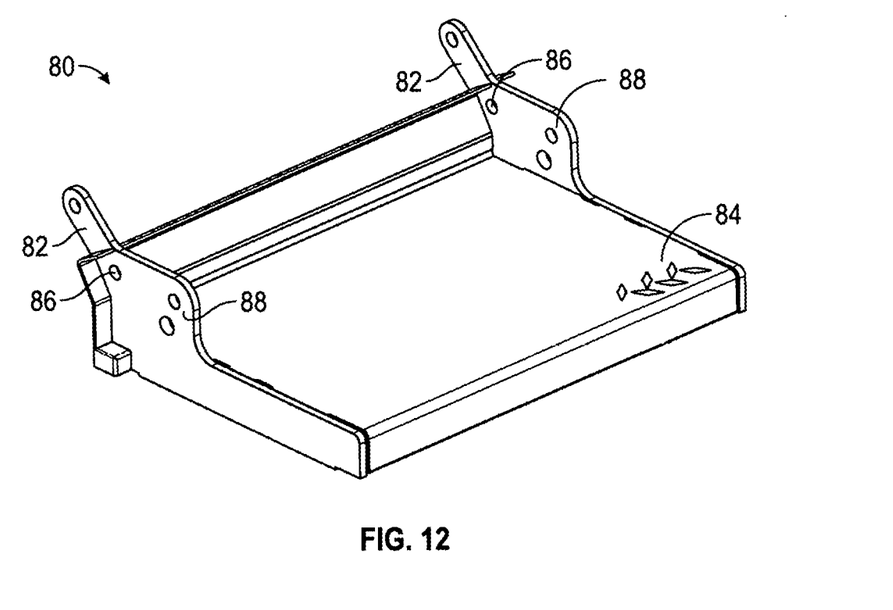
Figure 13:
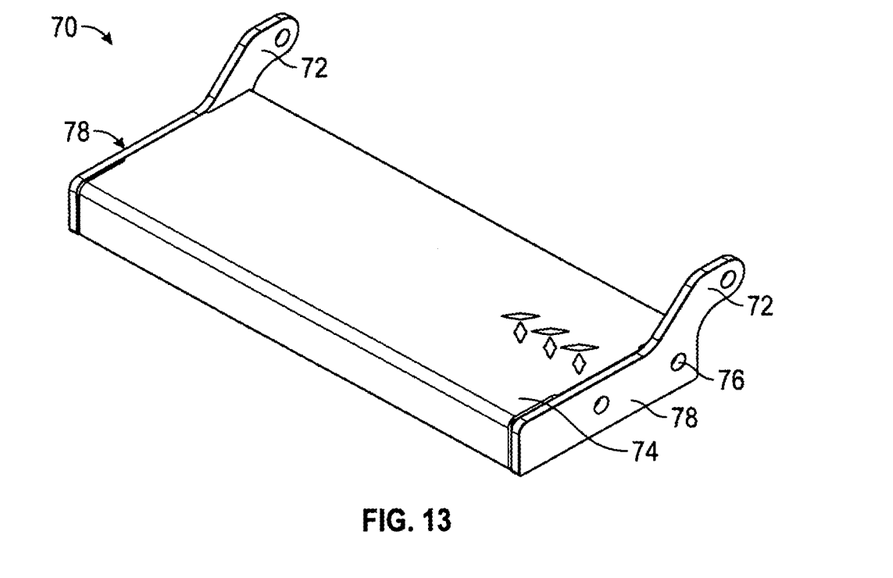

Referring to FIGS. 5-6 and 11-13, upper stair 70 includes a tab, shown as ear 72, extending from a step body, shown as upper step 74. As shown in FIG. 13, upper stair 70 includes a pair of ears 72 extending from upper step 74. According to an exemplary embodiment, lower stair 80 includes a tab, shown as ear 82, extending from a step body, shown as lower step 84. As shown in FIGS. 11-12, lower stair 80 includes a pair of ears 82 extending from lower step 84. According to an exemplary embodiment, ears 72 and ears 82 are positioned on opposing sides of upper step 74 and lower step 84, respectively. Upper step 74 and lower step 84 are configured to provide a surface that facilitates access by an operator into the interior of front cabin 40. According to an exemplary embodiment, upper step 74 and lower step 84 each include a step surface that an operator may engage (e.g., place a foot upon and press upon to step into front cabin 40). The step surface may include a flat surface, a wire surface having a plurality of holes therethrough, a dimpled surface, or a textured surface (e.g., diamond plate, etc.) among other alternatives.

According to an exemplary embodiment, stair assembly 60 complies with various fire truck design requirements (e.g., requirements set forth by the National Fire Protection Association, etc.). By way of example, when stair assembly 60 is configured in the storage position, stair assembly is further than twenty four inches from a ground surface. According to an exemplary embodiment, ears 72 and ears 82 facilitate the deployment of lower step closer to a ground surface than traditional stair assemblies (e.g., a height that is less than twenty four inches from the ground surface), thereby improving operator comfort without sacrificing NFPA compliance.

Figure 6:
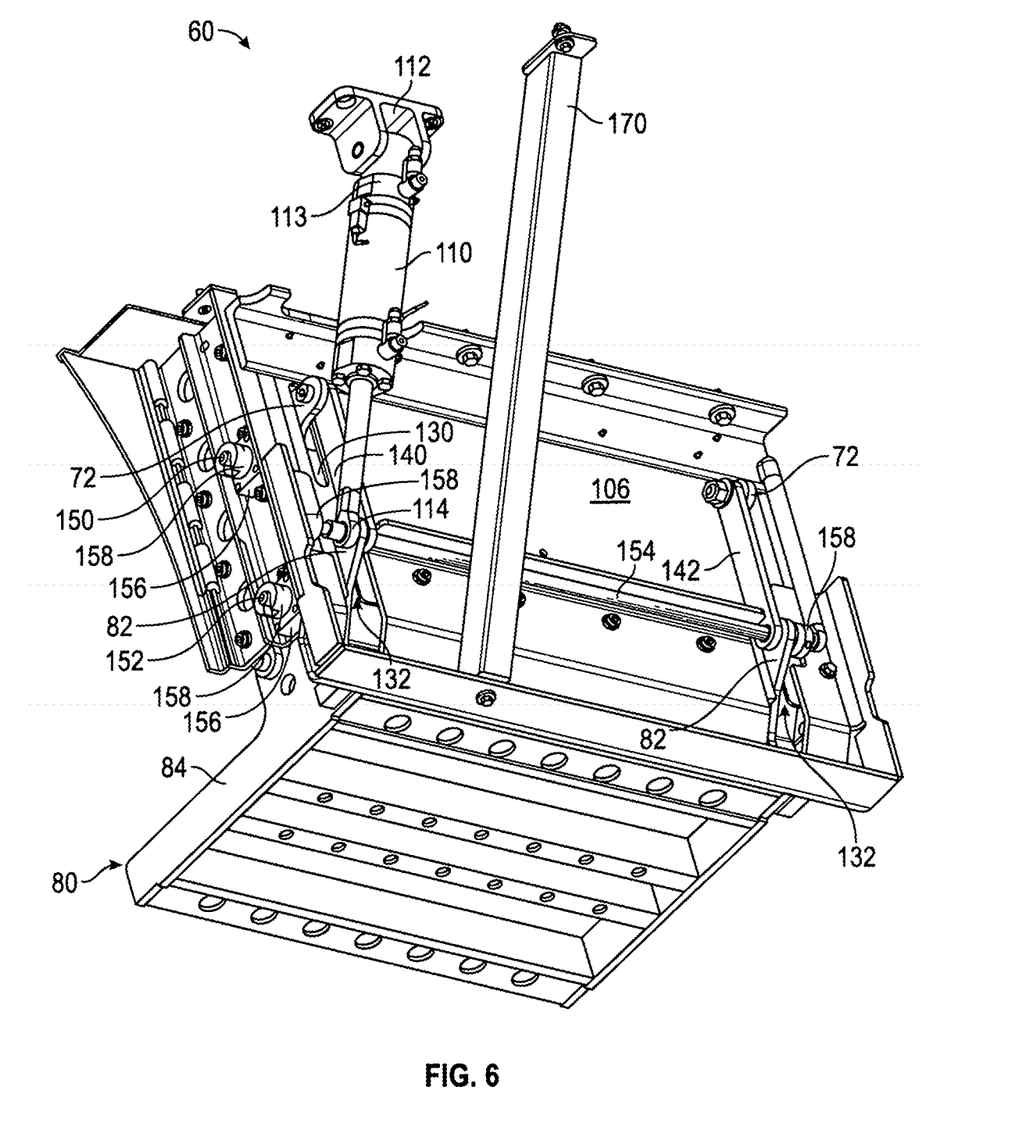
FIG. 6 is a bottom rear elevation view of a stair assembly configured in a deployed position, according to an exemplary embodiment.
Figure 7:
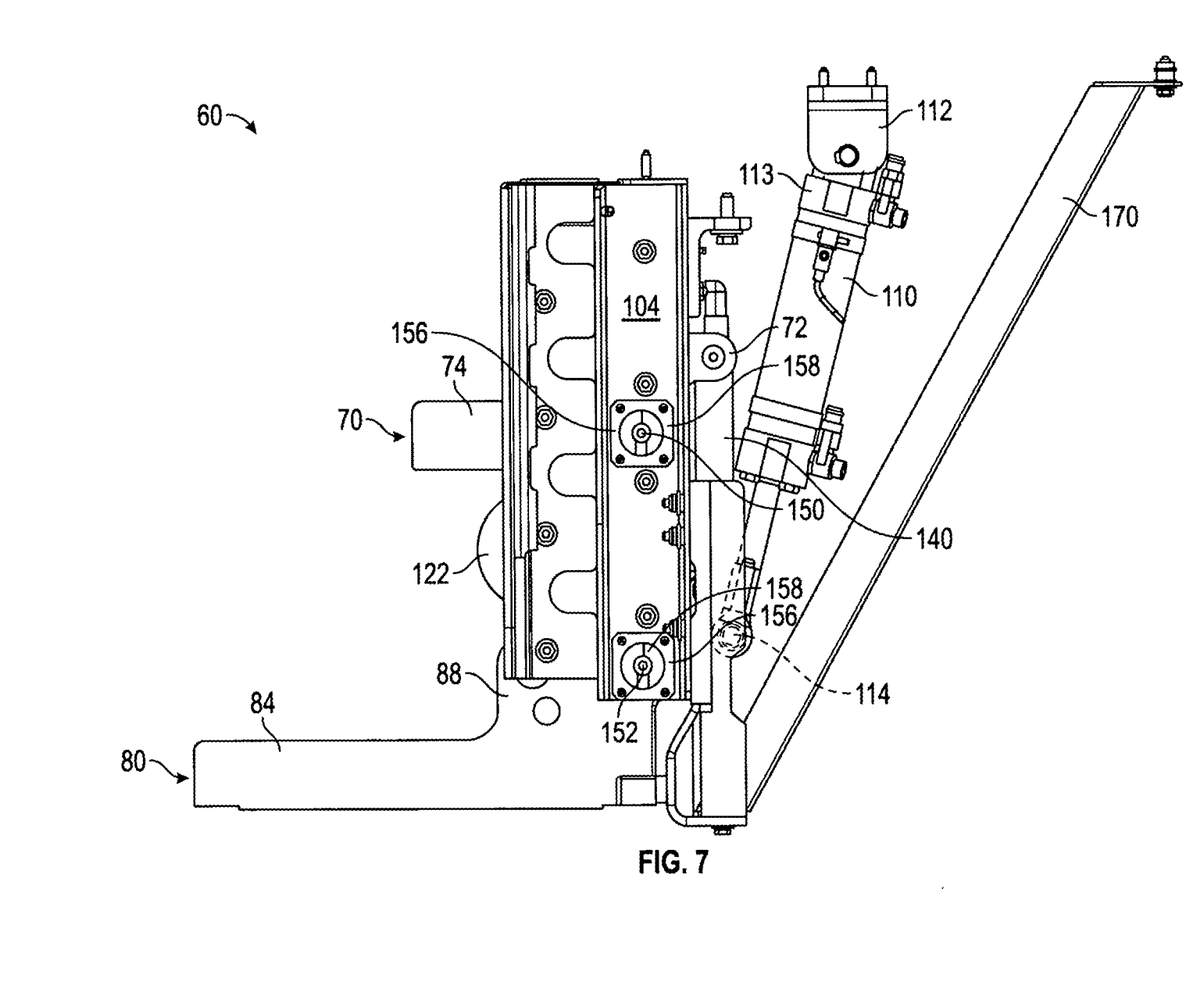
FIG. 7 is a right plan view of a stair assembly configured in a deployed position, according to an exemplary embodiment.
Figure 8:
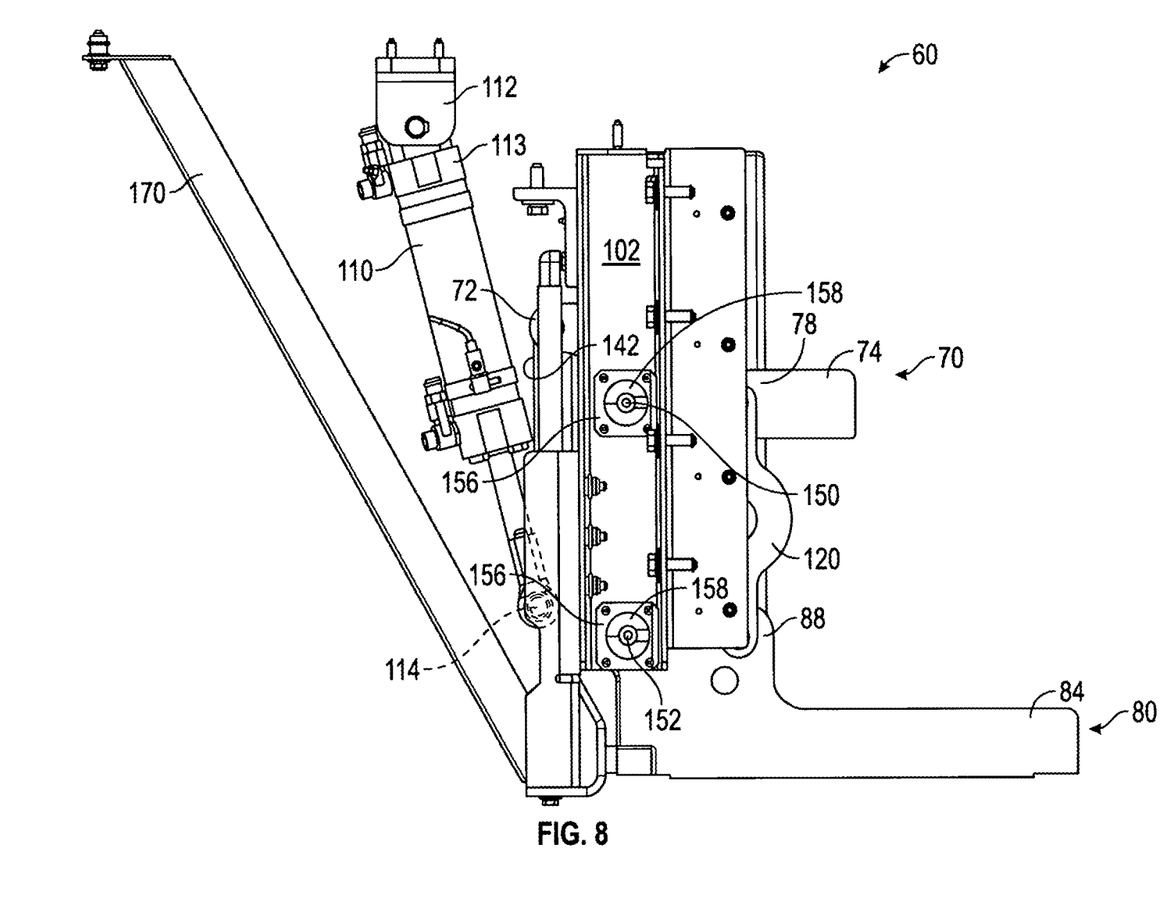
FIG. 8 is a left plan view of a stair assembly configured in a deployed position, according to an exemplary embodiment.
Figure 9:
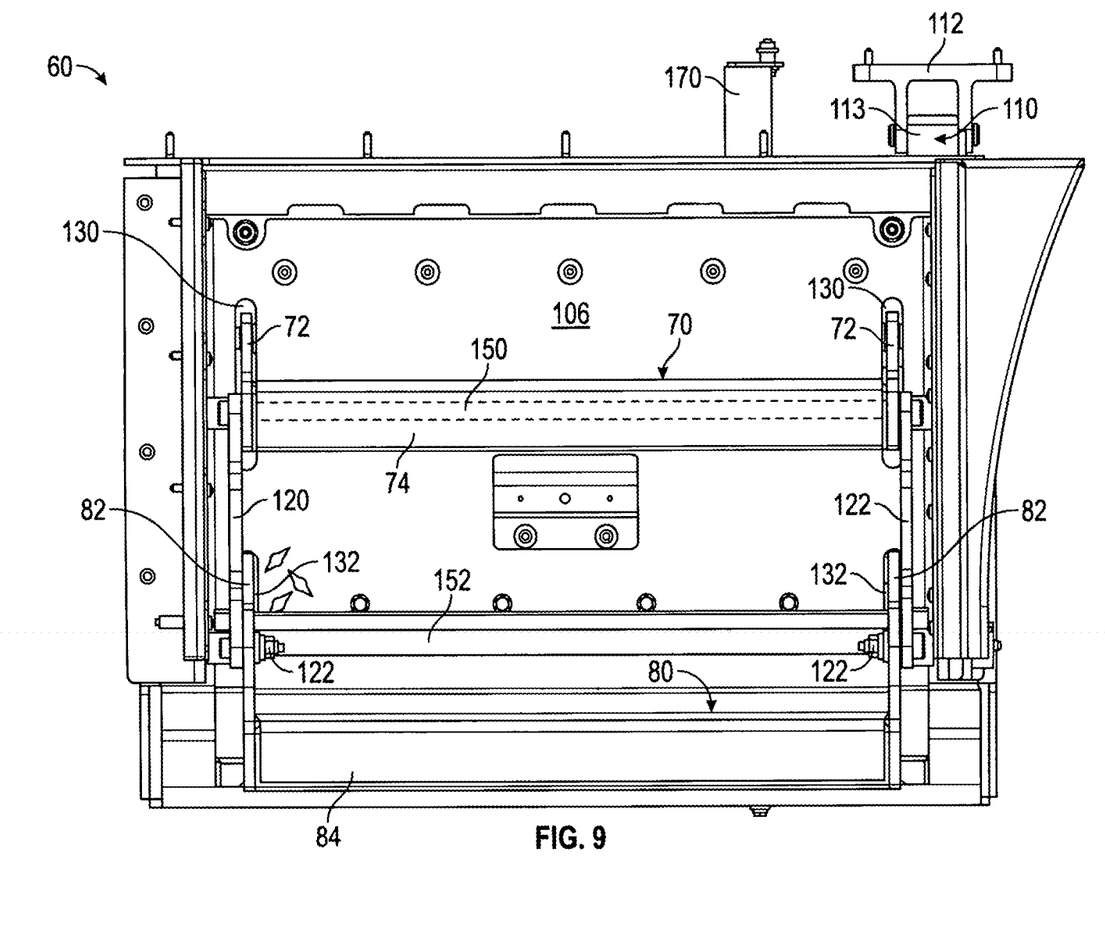
FIG. 9 is a front plan view of a stair assembly configured in a deployed position, according to an exemplary embodiment.

Referring to FIGS. 5-13, upper stair 70 and lower stair 80 are rotatably coupled to step box 100. As shown in FIGS. 5-10, upper step 74 defines a first pair of apertures, shown as holes 76, that receive a rod, shown as first rod 150, therethrough. According to an exemplary embodiment, lower step 84 defines a second pair of apertures, shown as holes 86, that receive a rod, shown as second rod 152, therethrough. As shown in FIGS. 6-8, first rod 150 and second rod 152 have ends that are coupled to step box 100. According to an exemplary embodiment, the rod ends extend through a bearing positioned within a support member, shown as bearing block 156. According to an alternative embodiment, bearing block 156 includes another device configured to reduce friction forces that oppose the rotation of upper stair 70 and lower stair 80 (e.g., a bushing). Bearing block 156 is fixed (e.g., bolted, welded, adhesively secured, etc.) to step box 100, according to an exemplary embodiment. As shown in FIGS. 6-8, first rod 150 and second rod 152 are secured by a retainer, shown as annular ring 158. Annular ring 158 includes an aperture that receives at least one of first rod 150 and second rod 152. A set screw may be threaded into a side face of annular ring 158 to secure at least one of first rod 150 and second rod 152 (e.g., to prevent first rod 150 and second rod 152 from sliding out a side of upper stair 70 or lower stair 80). According to an exemplary embodiment, annular ring 158 is manufactured from a material having a low coefficient of friction to reduce the friction forces resisting movement of upper stair 70 and lower stair 80.

Upper stair 70 and lower stair 80 rotate relative to step box 100 about first rod 150 and second rod 152, respectively, between the deployed position and the storage position. According to an exemplary embodiment, first rod 150 defines a first pivot axis, and second rod 152 defines a second pivot axis. In one embodiment, holes 76 are aligned with upper step 74 and holes 86 are offset from lower step 84 such that the second pivot axis is offset from lower step 84. As shown in FIGS. 7-8, second rod 152 is vertically offset a specified distance from lower step 84 (e.g., two inches above the lower step surface). An offset second pivot axis reduces the volume consumed by stair assembly 60 when configured in the storage position. According to an exemplary embodiment, the step surface of lower step 84 nests against upper step 74 when stair assembly 60 is configured in the storage position. According to an alternative embodiment, upper stair 70 and lower stair 80 are otherwise coupled to step box 100 or otherwise actuate between the deployed position and the storage position.

As shown in FIGS. 5-6 and 9-10, kick plate 106 defines a plurality of apertures configured to receive pair of ears 72 and pair of ears 82 therethrough. According to an exemplary embodiment, kick plate 106 defines first apertures, shown as slots 130, that receive ears 72 and second apertures, shown as slots 132, that receive ears 82. As shown in FIGS. 5-6 and 9-10, ears 72 extend (i.e. protrude) through slots 130, and ears 82 extend (i.e. protrude) through slots 132. While shown in FIGS. 5-6 and 9-10 as oblong ovals, it should be understood that slots 130 and slots 132 may be otherwise shaped.

According to an exemplary embodiment, stair assembly 60 includes an actuator, shown as linear actuator 110. Linear actuator 110 is configured to facilitate the deployment and storage of stair assembly 60. By way of example, linear actuator 110 may be configured to move upper stair 70 and lower stair 80 between the deployed position and the storage position. While shown in FIGS. 5-10 as a linear actuator, the actuator may be another type of actuator (e.g., a rotational actuator, etc.).

According to an exemplary embodiment, linear actuator 110 is a pneumatic actuator configured to extend and retract upon interacting with a pressurized air source (e.g., a high pressure air tank, a low pressure environment, a pneumatic pump, etc.). In one embodiment, a dedicated air supply tank is coupled to linear actuator 110, to assure an adequate air supply for activation of stair assembly 60 (e.g., sufficient air, air at a preferred pressure, etc.). A pneumatic pump (e.g., a piston pump) may be provided to provide pressurized air to the air supply tank. According to an alternative embodiment, linear actuator 110 is a mechanical actuator (e.g., a linkage, etc.), an electric actuator, a hydraulic actuator, or still another type of actuator.

Linear actuator 110 may receive an indication for changing the state of stair assembly 60. According to an exemplary embodiment, when door 50 is opened, linear actuator 110 is acted upon to retract such that stair assembly 60 is deployed, and when door 50 is closed, linear actuator 110 is acted upon to extend such that stair assembly 60 is moved into the storage position. As another example, when fire truck 10 is coming to a stop, linear actuator 110 may receive a generated signal indicating that the vehicle is about to stop and that passengers may be preparing to exit the vehicle, thereby causing retraction of linear actuator 110 and the deployment of stair assembly 60. As yet another example, linear actuator 110 may receive a user input to deploy or retract stair assembly 60.

According to an exemplary embodiment, stair assembly 60 may be operated by a switch (e.g., an electrical switch, a pneumatic valve, etc.) that is coupled (e.g., electronically coupled, pneumatically coupled, etc.) to linear actuator 110. According to an exemplary embodiment, the switch is positioned on a frame of a door, the opening and closing of the door actuating the switch and deploying or storing stair assembly 60, respectively. According to an alternative embodiment, the switch is otherwise positioned (e.g., along a side panel of front cabin 40). The switch may be an electronic switch that triggers the opening and closing of a valve positioned along a supply line between the air supply tank and linear actuator 110. In other embodiments, the switch is itself a valve in fluid communication with the air supply tank and linear actuator 110, the opening of the valve supplying pressurized air to linear actuator 110 (e.g., to retract linear actuator 110 and configure stair assembly 60 in the storage position). In some embodiments, the air supply tank is coupled to at least one of stair assembly 60 and fire truck 10 with a bracket. The bracket may be manufactured of a material selected to reduce the risk of corrosion (e.g., stainless steel, a polymeric material, etc.).

As shown in FIG. 6, a mounting block, shown as clevis 112, is configured to be coupled (e.g., fixed, bolted, welded, adhesively secured, etc.) to a support of front cabin 40. According to an exemplary embodiment, linear actuator 110 includes a first end, shown as tube end 113, and a second end, shown as rod end 114. Tube end 113 is rotatably coupled to clevis 112 with a pin, according to an exemplary embodiment. Rod end 114 is configured to be coupled to at least one of ear 72 and ear 82, according to an exemplary embodiment. In other embodiments, tube end 113 is coupled to at least one of ear 72 and ear 82, and rod end 114 is configured to be coupled to a support of front cabin 40 with clevis 112. According to an exemplary embodiment, extension and retraction of linear actuator 110 rotates upper stair 70 and lower stair 80 between a storage position and a deployed position.

Referring again to FIGS. 5-6, upper step 74 and lower step 84 are positioned on a first side of kick plate 106, and linear actuator 110 is positioned on a second side of kick plate 106 (i.e. kick plate 106 separates linear actuator 110 from upper step 74 and lower step 84). According to an exemplary embodiment, upper step 74 and lower step 84 are positioned laterally outward of kick plate 106 (i.e. further from a centerline of the vehicle than kick plate 106), and linear actuator 110 is positioned laterally inward of kick plate 106 (i.e. closer to a centerline of the vehicle than kick plate 106).

According to an exemplary embodiment, various components operatively couple upper stair 70 with lower stair 80. Upper stair 70 and operatively coupled lower stair 80 move in concert (i.e. in unison, together, simultaneously, etc.) between the deployed position and the storage position, according to an exemplary embodiment. In some embodiments, a link extends between upper stair 70 and lower stair 80 at a location that is laterally outward of kick plate 106. As shown in FIGS. 5-10, a link, shown as link 120, is coupled to an interfacing portion 78 of upper step 74 and an interfacing portion 88 of lower step 84. Link 120 rotatably couples upper stair 70 and lower stair 80 (e.g., as lower step 84 rotates upward about second rod 152, upper step 74 is pushed upward and rotates about first rod 150). According to an exemplary embodiment, stair assembly 60 includes a pair of links 120 coupled to opposing sides of upper step 74 and lower step 84. A plurality of couplers, shown as bolted connections 122, couple links 120 to interfacing portions 78 of upper step 74 and interfacing portions 88 of lower step 84.

According to the exemplary embodiment shown in FIGS. 5-10, a link extends between upper stair 70 and lower stair 80 at a location that is laterally inward of kick plate 106. As shown in FIGS. 5-10, a link, shown as link 140, is coupled to ear 72 of upper stair 70 and ear 82 of lower stair 80. Link 140 rotatably couples upper stair 70 and lower stair 80 (e.g., as ear 82 rotates downward about second rod 152, ear 72 is pulled downward and rotates about first rod 150). According to an exemplary embodiment, stair assembly 60 includes a pair of links 140 coupled to the pair of ears 72 of upper stair 70 and the pair of ears 82 of lower stair 80. Links 140 may be coupled to ears 72 and ears 82 with couplers (e.g., bolted connections, snap rings, etc.).

According to an exemplary embodiment, ears 72 and ears 82 define first interfacing points and second interfacing points, respectively. As shown in FIG. 6, links 140 are coupled to ears 72 and ears 82 at the first interfacing points and the second interfacing points, respectively. In some embodiments, the first interfacing points and the second interfacing points are apertures configured to receive a bolt therethrough. As shown in FIGS. 6-8 and 10, ears 72 and ears 82 extend through slots 130 and slots 132, and the first interfacing points and the second interfacing points are positioned laterally inward of kick plate 106. In one embodiment, upper step 74 and lower step 84 are positioned on a first side of kick plate 106 and the first interfacing point and the second interfacing point are positioned on a second side of kick plate 106.

Figure 10:
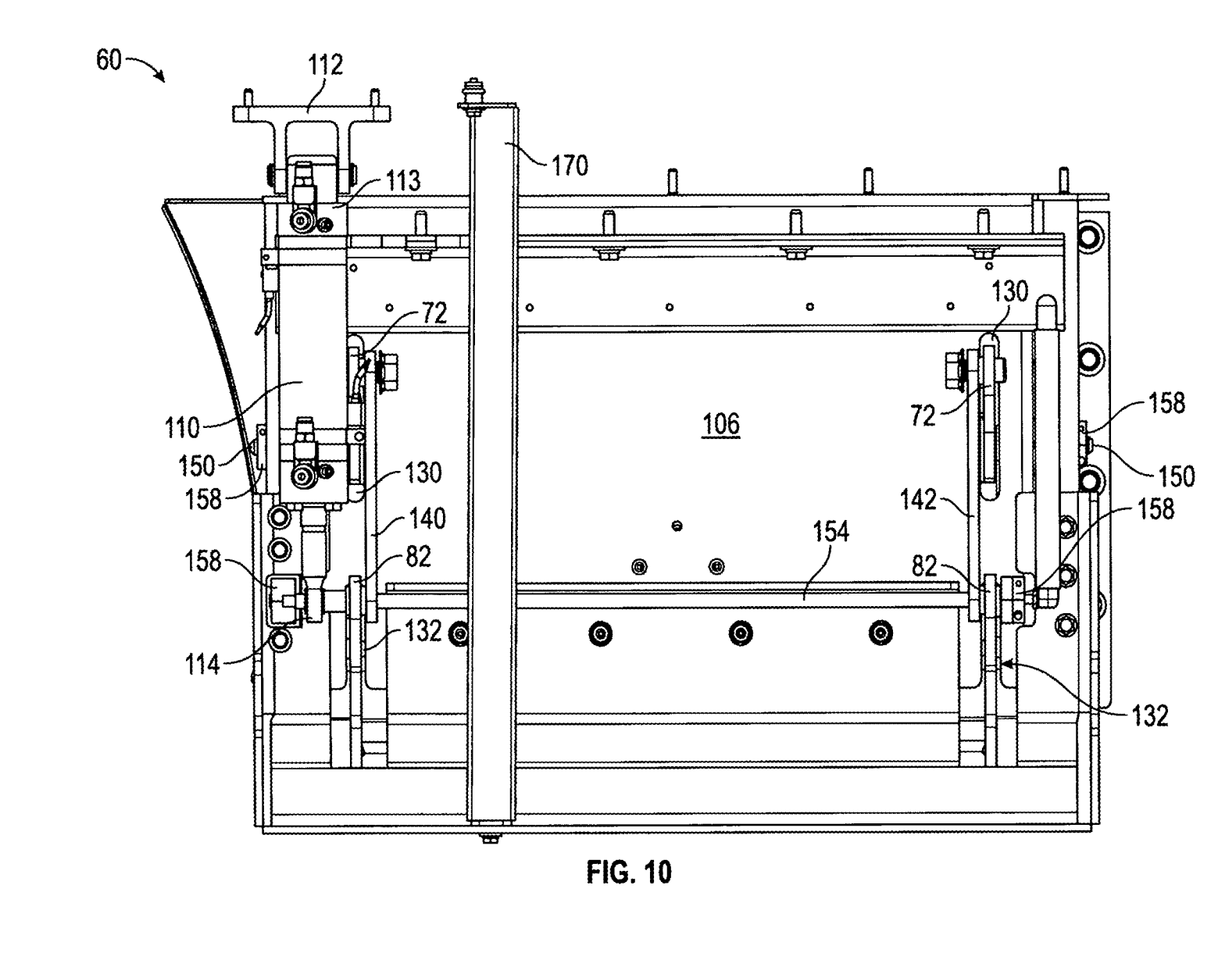
FIG. 10 is a rear plan view of a stair assembly configured in a deployed position, according to another exemplary embodiment.

As shown in FIGS. 6 and 10, a rod, shown as connecting rod 154, extends between ears 82 of lower stair 80. According to an exemplary embodiment, connecting rod 154 also extends through apertures in links 140 thereby operatively coupling both lateral sides of upper stair 70 and lower stair 80. Connecting rod 154 may include ends that are secured with annular rings 158.

According to an exemplary embodiment, rod end 114 of linear actuator 110 is configured to be coupled to connecting rod 154. Rod end 114 may be coupled at any point along the length of connecting rod 154. According to an exemplary embodiment, rod end 114 is coupled to an end portion of connecting rod 154. According to an alternative embodiment, rod end 114 is coupled to a middle portion of connecting rod 154. In some embodiments, rod end 114 defines an aperture that receives connecting rod 154 therethrough. In other embodiments, rod end 114 is otherwise coupled to connecting rod 154.

According to an exemplary embodiment, extension of linear actuator 110 applies a downward force to connecting rod 154 and ear 82 of lower stair 80. The downward force imparts a turning moment on lower stair 80 about second rod 152. The turning moment applies an upward force through links 120 and into upper step 74, which imparts a turning moment on upper stair 70 about first rod 150. The downward force from linear actuator 110 is transferred by link 140 to upper stair 70 and applies a downward force on ear 72. The downward force on upper ear 72 imparts a turning moment on upper stair 70 about first rod 150. Such forces and moments rotate upper step 74 and lower step 84 about first rod 150 and second rod 152, respectively, thereby configuring upper stair 70 and lower stair 80 into the storage configuration. Retraction of linear actuator 110 applies opposite forces that impart different turning moments to configure upper stair 70 and lower stair 80 into the deployed position.

As shown in FIGS. 4-10, links 140, connecting rod 154 and linear actuator 110 are installed behind kick plate 106 (e.g., closer to a centerline of the vehicle than kick plate 106). This may allow for more room within stair assembly 60 for foot traffic (e.g., such components do not impede an operator's step), may reduce the risk of damage to such components (e.g., the components are protected by kick plate 106), and may be more aesthetically appealing (e.g., such components are hidden from view). In other embodiments, at least one of links 140, connecting rod 154, and linear actuator 110 is installed behind kick plate 106.

According to an alternative embodiment, stair assembly 60 does not include links 120. Forces may be transferred between upper stair 70 and lower stair 80 through links 140. According to still another alternative embodiment, stair assembly does not include links 140. Forces may be transferred between upper stair 70 and lower stair 80 through links 120. According to still another alternative embodiment, stair assembly 60 does not include links 120 or links 140. A plurality of actuators (e.g., a linear actuator coupled to each of upper stair 70 and lower stair 80) may move stair assembly 60 into the deployed position or the storage position.

According to an exemplary embodiment, a method of providing ingress and egress for a vehicle includes providing a stair assembly. The stair assembly includes a frame including a plate extending between a first side member and a second side member, a first stair rotatably coupled to the frame and including a first step body positioned laterally outward of the plate, and a second stair rotatably coupled to the frame and including a second step body positioned laterally outward of the plate. The method may further include moving the first stair and the second stair between a deployed position and a storage position with an actuator positioned laterally inward of the plate.

The construction and arrangements of the vehicle, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions and arrangement of the various exemplary embodiments without departing from the scope of the present invention.

The invention claimed is:

1. A stair assembly for a vehicle, the stair assembly comprising:
  a frame including a plate extending between a first side member and a second side member;
  a first stair rotatably coupled to the frame and including a first step body positioned on a first side of the plate, wherein the first stair is configured to rotate relative to the frame about a first axis that is fixed relative to the frame;
  a second stair rotatably coupled to the frame and including a second step body positioned on the first side of the plate, wherein the second stair is configured to rotate relative to the frame about a second axis that is fixed relative to the frame; and
  an actuator configured to move the first stair and the second stair between a deployed position and a storage position, wherein the plate extends directly between the actuator and the first step body.

2. The stair assembly of claim 1, wherein the actuator includes a linear actuator configured to apply a force in a first direction to move the first stair and the second stair toward the deployed position and configured to apply a force in a second direction opposite the first direction to move the first stair and the second stair toward the storage position.

3. The stair assembly of claim 1, wherein the first stair includes a first tab extending from the first step body onto a second side of the plate.

4. The stair assembly of claim 3, wherein the second stair includes a second tab extending from the second step body onto the second side of the plate.

5. The stair assembly of claim 3, further comprising a link extending between the first step body and the second step body, wherein the link rotatably couples the first stair and the second stair.

6. The stair assembly of claim 5, wherein the actuator includes a linear actuator having a first fixed end and a second end coupled to the first tab such that extension and retraction of the actuator rotates the first stair and the second stair between the deployed position and the storage position.

7. The stair assembly of claim 1, further comprising a link coupled to the first stair and the second stair such that the first stair and the second stair are operatively coupled, wherein the link extends on the second side of the plate.

8. The stair assembly of claim 7, wherein the actuator includes a linear actuator having a first fixed end and a second end coupled to the link such that extension and retraction of the actuator rotates the first stair and the second stair between the deployed position and the storage position.

9. A stair assembly for a vehicle, the stair assembly comprising:
  a frame including a plate extending between a first side member and a second side member;
  a first stair rotatably coupled to the frame and including a first step body positioned on a first side of the plate, wherein the first stair defines a first aperture that receives a first rod therethrough, and wherein the first stair rotates about the first rod;
  a second stair rotatably coupled to the frame and including a second step body positioned on the first side of the plate, wherein the second stair defines a second aperture that receives a second rod therethrough, wherein the second stair rotates about the second rod, wherein the first aperture is spaced from the first step body, and wherein the second aperture is aligned with the second step body such that the first step body nests against the second stair when the stair assembly is configured in a storage position; and an actuator configured to move the first stair and the second stair between a deployed position and the storage position, wherein the plate extends directly between the actuator and the first step body.

10. The stair assembly of claim 9, wherein the first rod and the second rod include ends that are coupled to the frame of the stair assembly.

11. A vehicle comprising:
a cab assembly including a body panel coupled to a support, wherein the body panel defines an opening through which an operator accesses an interior of the cab assembly; and
a stair assembly positioned at a lower portion of the opening and moveable between a deployed position and a storage position, the stair assembly including:
a frame coupled to the support of the cab assembly, the frame including a plate extending between a first side member and a second side member;
a first stair rotatably coupled to the frame and including a first step body positioned laterally outward of the plate, wherein the first stair is configured to rotate relative to the frame about a first axis that is fixed relative to the frame;
a second stair rotatably coupled to the frame and including a second step body positioned laterally outward of the plate, wherein the second stair is configured to rotate relative to the frame about a second axis that is fixed relative to the frame; and
an actuator configured to move the stair assembly between the deployed position and the storage position, wherein the actuator is positioned laterally inward of the plate, and wherein the plate extends directly between the actuator and the second step body.

12. The vehicle of claim 11, wherein the first stair includes a first tab extending from the first step body laterally inward of the plate.

13. The vehicle of claim 12, wherein the second stair includes a second tab extending from the second step body laterally inward of the plate.

14. The vehicle of claim 11, further comprising a first link coupled to the first stair and the second stair such that the first stair and the second stair are operatively coupled, wherein the first link extends laterally inward of the plate.

15. The vehicle of claim 14, wherein the actuator includes a linear actuator having a first end coupled to the support of the cab assembly and a second end coupled to the first link such that extension and retraction of the actuator rotates the first stair and the second stair between the deployed position and the storage position.

16. The vehicle of claim 15, further comprising a second link extending between the first step body and the second step body, wherein the link rotatably couples the first stair and the second stair.

* * * * *